United States Patent [19]

Luczak

[11] Patent Number: 5,013,618

[45] Date of Patent: May 7, 1991

[54] TERNARY ALLOY FUEL CELL CATALYSTS AND PHOSPHORIC ACID FUEL CELL CONTAINING THE CATALYSTS

[75] Inventor: Francis J. Luczak, Glastonbury, Conn.

[73] Assignee: International Fuel Cells Corporation, South Windsor, Conn.

[21] Appl. No.: 402,328

[22] Filed: Sep. 5, 1989

[51] Int. Cl.$^5$ .................... H01M 4/92; B01J 21/06; B01J 23/64; B01J 23/89
[52] U.S. Cl. ........................... 429/44; 429/40; 502/185; 502/313; 502/324; 502/326; 502/339
[58] Field of Search ............... 502/313, 324, 326, 339, 502/185; 420/466; 429/40, 44

[56] References Cited

U.S. PATENT DOCUMENTS

| | | | |
|---|---|---|---|
| 3,291,753 | 12/1966 | Thompson | 502/185 X |
| 3,428,544 | 2/1969 | Bianchi et al. | 429/40 X |
| 4,202,934 | 5/1980 | Jalan | 429/40 |
| 4,316,944 | 2/1982 | Landsman et al. | 429/44 |
| 4,447,506 | 5/1984 | Luczak et al. | 429/44 |
| 4,613,582 | 9/1986 | Luczak et al. | 502/185 |
| 4,806,515 | 2/1989 | Luczak et al. | 502/185 |

*Primary Examiner*—W. J. Shine
*Attorney, Agent, or Firm*—William J. Sapone

[57] ABSTRACT

A noble metal ternary alloy catalyst, which has increased mass activity and stability. This catalyst comprises a ternary alloy of platinum, iridium and a metal selected from the group consisting of iron, chromium, cobalt, nickel, vanadium, titanium and manganese.

6 Claims, No Drawings

TERNARY ALLOY FUEL CELL CATALYSTS AND PHOSPHORIC ACID FUEL CELL CONTAINING THE CATALYSTS

DESCRIPTION

1. Technical Field

The present invention relates to noble metal catalysts and especially to ternary alloys of platinum for use in fuel cell electrodes and other catalytic structures.

2. Background Art

During operation a continuous flow of fuel, commonly hydrogen, is fed to the anode while, simultaneously, a continuous flow of oxidant, commonly air, is fed to the cathode. The fuel is oxidized at the anode with a release of electrons through the agency of a catalyst. These electrons are then conducted to the cathode through wires external to the cell, where the oxidant is reduced and the electrons are consumed, again through the agency of a catalyst. The constant flow of electrons from the anode to the cathode constitutes an electrical current which can be made to do useful work.

The type of fuel cell which is in the most advanced state of development, and which is being used in commercial power plants to generate electricity at the 10–5,000 KW level, contains concentrated phosphoric acid as electrolyte and operates at 325°–425° F.

The efficiency at which the cell operates is determined by several parameters, not the least of which is the activity of the cathode catalyst. This activity is measured by the rate at which the electrochemical reduction of the oxidant proceeds on the surface of the catalyst in the presence of the electrolyte at a specified temperature and electrochemical potential. There have been many attempts over the years to find inexpensive, highly active catalysts. However, the choice of materials is severely limited since any catalyst which is developed for this purpose must not only have a high activity for the electrochemical reduction of oxygen, but must be capable of withstanding a working environment of relatively high temperatures while being exposed to a strong acid.

Initially, catalysts were made of platinum or other noble metals, as these materials were best able to withstand the corrosive environment of the electrochemical cell. Later, these noble metals were dispersed over the surface of electrically conductive supports (e.g. carbon black) to increase the surface area of the catalyst which in turn increased the number of reactive sites leading to improved efficiency of the cell. It was then discovered that certain alloys of noble metals exhibited increased catalytic activity, further increasing fuel cell efficiencies. Some of these alloys are platinum-chromium (commonly assigned U.S. Pat. No. 4,316,944) and platinum-vanadium (commonly assigned U.S. Pat. No. 4,202,934). In addition, commonly assigned U.S. Pat. No. 4,447,506 describes a ternary alloy catalyst containing platinum.

These increases in fuel cell efficiency coupled with the increase in cost of other energy sources contributes to even greater utilization of the fuel cell. Therefore, the search continues for stable catalysts with increased activity for the electrochemical reduction of oxygen over that which is presently available.

DISCLOSURE OF INVENTION

The present invention is directed to a noble metal ternary alloy catalyst, which has increased mass activity and stability. This catalyst comprises a ternary alloy of platinum, iridium and a metal selected from the group consisting of iron, chromium, cobalt, nickel, vanadium, titanium and manganese.

Another aspect of the invention is a fuel cell containing the above-described catalyst.

The foregoing and other features and advantages of the present invention will become more apparent from the following description.

BEST MODE OF CARRYING OUT THE INVENTION

The catalysts of this invention have the formula $Pt_i Ir_j X_k$ where X is selected from the group consisting of Ti, Mn, Ni, Co, V, Cr and Fe. Preferably X is Cr or Fe because these ternaries provide the greatest oxygen reduction activity. It is especially preferred that X is Fe because the PtIrFe alloy provides the greatest activity. It is also preferred that $40 \leq i \leq 80$, $20 \leq j \leq 50$ and $10 \leq k \leq 30$ because the activity of the ternary is highest for this range of compositions. It is especially preferred for the PtIrFe alloy that $45 \leq i \leq 55$, $15 \leq j \leq 25$, and $25 \leq k \leq 35$ since this composition leads to the most active catalyst. When X is Cr, the preferred composition is $45 \leq i \leq 55$, $25 \leq j \leq 35$, and $15 \leq k \leq 25$ because that provides the most active composition for that system.

The invention is preferably practiced using a conductive carbon support material which can be prepared with surface areas in excess of 80 $m^2/gm$. Some electrically conductive supports which are available commercially and can be used are acetylene-black (Gulf Oil Corporation) or VULCAN XC-72 (TM) oil furnace black from Cabot Corporation. These carbon blacks may be used as supports in their as-received condition or may be graphitized to increase their oxidation resistance prior to absorption of the metals.

It is preferred to use water as the medium for the adsorption of the materials onto the substrate because of the high dielectric constant of water. This reduces the bond strength between atoms in ionic compounds and allows them to be easily separated. In addition, water contains only the elements of hydrogen and oxygen which are already a part of the support so no new elements are introduced to the catalyst. However, it is believed that organic solvents in which the solubilities of the metal compounds may be adjusted may be used.

The above catalysts may be made by any of a variety of methods that produces the highly active catalysts of this invention. Typically a finely divided carbon support, a water soluble platinum compound, and a water soluble iridium compound are combined in an aqueous solution and reduced (e.g. HCOH) to precipitate the metals. Typically, the metals are in the form of salts or organometallic complexes. The precipitated metals adsorb onto the substrate and the resulting supported catalyst is collected. The binary catalyst is suspended in an aqueous solution and a water soluble salt of the desired third metal is added to the binary catalyst solution. The solution is evaporated to dryness and the solids are calcined under nitrogen for a temperature and time sufficient to bring the metals together into a high surface area supported alloy. Typically, the temperatures are about 1600° F. to about 1800° F. and over a time period of about 30 minutes to about 120 minutes.

EXAMPLE

Six grams of VULCITE (TM) carbon were added to 397 ml of $H_2O$ and stirred for fifteen minutes. 2.9095 grams $NaHCO_3$ were added to the above suspension. The mixture was stirred and ultrasonically blended for fifteen minutes. The blended mixture was then stirred and boiled for thirty minutes. In a separate beaker 0.7231 grams $IrCl_4$ was dissolved in 30 ml $H_2O$. The $IrCl_4$ solution was stirred until completely dissolved. A separate chloroplatinic acid solution was made by adding sufficient chloroplatinic acid to $H_2O$ to make a concentration of 95 mg Pt/ml. 7.4 ml of the chloroplatinic acid solution was added to the $IrCl_4$ solution and stirred thoroughly. The above solution was diluted to 50 mils with $H_2O$ and added dropwise to the carbon suspension over a five minute period. The resulting suspension was stirred and boiled for fifteen minutes. In addition, 4.52 ml of 37% HCOH was diluted to 50 ml with $H_2O$ and added dropwise to the above solution over a ten minute period during which boiling and stirring were maintained. The solution was then stirred and boiled for an additional 30 minutes and then filtered. The catalyst was rinsed with water and $NH_4HCO_3$ and collected. The catalyst was dried in an air oven at 190° F. overnight after which it was sieved through an 80 mesh screen.

Three grams of the above produced binary platinum iridium catalyst were added to 150 mils $H_2O$ and stirred for one minute. The mixture was mechanically stirred and ultrasonically blended for two minutes. 0.254 grams chromic nitrate was added to 25 mils $H_2O$ and stirred until completely dissolved. The chromic nitrate solution was added to the binary catalyst solution and adjusted to a pH of 5.5. with ammonium hydroxide. The above solution was ultrasonically blended and stirred for one minute and then stirred for fifteen minutes at a pH of 5.5. The catalyst was collected by evaporation at 190° F. and then sieved through an 80 mesh screen. The catalyst was heat treated under nitrogen at 1700° F. for one hour. The temperature was reduced to 1100° F. and maintained for one hour. The temperature was reduced to less than 90° F. and the catalyst removed to an air environment.

These new platinum-iridium-metal ternary catalysts are very active for the reduction of oxygen in phosphoric acid fuel cells. The activity, or more correctly the mass activity, is defined as the current density achieved by the catalyst at 0.9V divided by the loading of the platinum metal. This means that, when comparing catalysts, any increase in activity can be related to a current density increase for the same platinum content. The increase in current density has considerable significance in light of the fact that current density is a measure of the rate at which a fuel cell can do useful work and the voltage is a measure of its efficiency; therefore, a fuel cell utilizing the catalysts described by the present invention will be able to produce a greater amount of work while operating at the same efficiency.

The following table illustrates an increase in activity of about 10-15% for the above catalyst over a $Pt_{50}Co_{30}Cr_{20}$ ternary alloy catalyst. The test conditions were 350° F., 99% $H_3PO_4$ @0.9 volt under $O_2$.

TABLE 1

| Catalyst | Mass Activity mA/mg |
| --- | --- |
| $Pt_{50} Co_{30} Cr_{20}$ | 38.0 |
| $Pt_{50} Ir_{25} Cr_{25}$ | 42.9 |
| $Pt_{50} Ir_{30} Cr_{20}$ | 44.8 |
| $Pt_{75} Ir_{12.5} Cr_{12.5}$ | 28.2 |
| $Pt_{50} Ir_{20} Fe_{30}$ | 48 |

The amount of useful work produced by a fuel cell at a given efficiency decays with time of operation. There are many decay modes, e.g., catalyst degradation, electrode degradation, etc., but one of the primary modes is the deactivation of the cathode catalyst. The cathode catalyst, which reduces the oxygen in a fuel cell, losses performance because of the loss of total active area. The active area loss is attributable to two main causes: catalyst dissolution into the electrolyte and also the "sintering" of the catalyst. "Sintering" is the growth of the catalyst particles as a function of operating time. The individual catalyst particles have mobility on the support and periodically meet other particles, coalesce and grow in diameter. This growth reduces the active area of the catalyst since as the particles grow more of the catalyst is buried within the particle where it cannot interact with the oxidant. This "sintering" of the catalyst is the most important deactivation mechanism for the cathode catalyst for the typical operating conditions of the fuel cell.

It is a very important advantage for these platinum-iridium ternaries alloys that they exhibit a more stable surface area than that of the platinum-cobalt-chromium system. As shown in Table 2, the area loss for the platinum-iridium ternaries is more than 50% less than the platinum-cobalt-chromium alloy under typical operating conditions. This results in a larger work output over time for these new catalysts while maintaining a high efficiency. The following table indicates how the present catalysts maintain their surface area better. The test conditions were at 400° F., 0.75V, 99% $H_3PO_4$ for 168 hours.

TABLE 2

| Catalyst | % Surface Area Loss |
| --- | --- |
| $Pt_{50} Co_{30} Cr_{20}$ | 35.7 |
| $Pt_{50} Ir_{25} Cr_{25}$ | 13.0 |
| $Pt_{75} Ir_{12.5} Cr_{12.5}$ | 17.9 |
| $Pt_{50} Ir_{25} Co_{25}$ | 18.9 |

This result has also been illustrated in longer term subscale cell tests. Two cells were operated at 425° F. for 2,000 hours at a constant 200 ASF current density. The only difference between the cells was the cathode catalyst. One cell had a $Pt_{50} Co_{30}Cr_{20}$ catalyst while the second had a $Pt_{50}Ir_{30} Cr_{20}$ catalyst. The area changes for the two catalysts were measured and found to be:

TABLE 3

| Catalyst | Surface Area-$M^2$/gm | | |
| --- | --- | --- | --- |
| | Pre-Test | Post Test | Change % |
| $Pt_{50} Co_{30} CR_{20}$ | 60.0 | 19.9 | −66.8 |
| $Pt_{50} Ir_{30} Cr_{20}$ | 70.2 | 34.2 | −51.3 |

The alloy catalysts of this invention have particular utility as catalysts for the electrochemical reduction of oxygen. This activity makes these catalysts particularly suitable for use in acid fuel cells. However, these catalysts may find alternative applications in the chemical, pharmaceutical, automotive and anti-pollution fields.

Although the invention has been shown and described with respect to a preferred embodiment, it will be understood by those skilled in the art that various changes in form and detail thereof may be made without departing from the spirit and scope of the claimed invention.

What is claimed is:

1. A high activity, high stability phosphoric acid fuel cell catalyst particularly adapted for the reduction of oxygen in phosphoric acid fuel cells consisting essentially of:

a ternary noble metal catalyst having the composition $Pt_i Ir_j X_k$ where X is selected from the group consisting essentially of Ti, Mn, Ni, Co, V, Cr, and Fe and i is between 40 and 80, j is between 20 and 50, and k is between 10 and 30.

2. The catalyst as recited in claim 1 wherein X is Cr or Fe.

3. The catalyst as recited in claim 1 wherein X is Fe.

4. A phosphoric acid fuel cell having an anode and a cathode with phosphoric acid disposed therebetween, said cathode comprising a platinum containing ternary alloy supported catalyst wherein the improvement consisting essentially of:

said platinum alloy having alloys having the composition $Pt_i Ir_j, X_k$ where X is selected from the group consisting of Ti, Mn, Ni, Co, V, Cr, and Fe and $40 \leq i \leq 80$, $20 \leq j \leq 50$ and $10 \leq k \leq 30$.

5. The phosphoric acid fuel cell of claim 4, wherein X is Cr or Fe.

6. The phosphoric acid fuel cell of claim 4, wherein X is Fe.

* * * * *